United States Patent [19]

Hafer

[11] Patent Number: 4,530,092
[45] Date of Patent: Jul. 16, 1985

[54] DISTRIBUTED SWITCHING SYSTEM HAVING MULTIPLE TIME SLOT INTERCHANGER NODES

[75] Inventor: Edward H. Hafer, Winfield, Ill.

[73] Assignee: AT&T Bell Laboratories, Murray Hill, N.J.

[21] Appl. No.: 481,063

[22] Filed: Mar. 31, 1983

[51] Int. Cl.³ .............................. H04J 3/16; H04J 3/02
[52] U.S. Cl. ......................................... 370/66; 370/85; 370/89; 370/94
[58] Field of Search ............... 370/58, 66, 85, 94, 370/86, 60, 89; 179/18 GE, 18 GA

[56] References Cited

U.S. PATENT DOCUMENTS

| | | | |
|---|---|---|---|
| 3,916,124 | 10/1975 | Joel, Jr. | 179/18 GE |
| 4,161,786 | 7/1979 | Hopkins et al. | 370/94 |
| 4,251,880 | 2/1981 | Baugh et al. | 370/89 |
| 4,349,702 | 9/1982 | Joel, Jr. | 179/18 GE |
| 4,377,859 | 3/1983 | Dunning et al. | 370/58 |
| 4,380,063 | 4/1983 | Janson et al. | 370/60 |
| 4,399,531 | 8/1983 | Grande et al. | 370/94 |

OTHER PUBLICATIONS

ISS '81 CIC, Montreal, Sep. 21-25, 1981, Session 21B, Paper 3, "An Experimental Digit Switch for Data and Voice".

Primary Examiner—Douglas W. Olms
Assistant Examiner—Curtis Kuntz
Attorney, Agent, or Firm—Kenneth H. Samples

[57] ABSTRACT

Communications between stations served by different time slot interchangers (TSI) nodes in a telecommunications network are made possible without the use of either an intermediate stage of time multiplex space division switching or central time slot allocation by an arrangement in which each TSI node is linked to every other node by a patent in which each nodes time slots are "broadcast" to every other node in the network. Each time slot word includes a data or address (D/A) field and a status (ST) field. The D/A field of the time slot word is made subject to interpretation by the contents of the ST field and indicates an encoded item of telecommunications information only when the ST field is "busy". When the ST field requests or acknowledges allocation of the time slot by a TSI, the D/A field respectively identifies the address of the target or requesting TSI.

15 Claims, 5 Drawing Figures

4,530,092

DISTRIBUTED SWITCHING SYSTEM HAVING MULTIPLE TIME SLOT INTERCHANGER NODES

FIELD OF THE INVENTION

This invention relates to time multiplex switching systems and, more particularly, to such systems in which it is desired that communications take place between stations served by different time slot interchanger (TSI) nodes.

BACKGROUND OF THE INVENTION

Communication between two stations served by different TSI nodes requires the allocation of a common time slot for the path between the two TSI nodes. The allocation of a common time slot requires the use of a common controller. Typically, in systems consisting of many TSI nodes, the nodes are interconnected by an intermediate stage of time-multiplexed space division switching. This intermediate switching stage also requires a common controller.

SUMMARY OF THE INVENTION

In accordance with the principles of my invention, the need for any common controller device has been eliminated. Instead of interconnecting the TSI nodes with an intermediate stage of switching, I provide a simple cable path from each TSI node to every other TSI node so that the contents of each time slot in every node may be conveyed to every other node even if the time slot is being used for a call wholly within a single node. In addition, I have increased the number of bit positions in each time slot word by two bit positions so that the time slot word can be characterized as being in one of four possible states: busy, idle, requesting allocation of the time slot or acknowledging allocation of the requested time slot.

When an idle time slot is available at a node and it is desired to request allocation of that time slot in another node (which also appears to have that time slot idle) the requesting node changes the status bits of the idle time slot to the requesting allocation state. Into the remaining bit positions of the time slot, those that would normally be used to carry data if the time slot were busy, the requesting node inserts the address of the node (the target node) in which it is desired that the time slot be allocated. If, in the addressed target node, the same time slot is also idle, that node changes the status bits to acknowledge the allocation request and, in the remaining bit positions, inserts the address of the node (the requesting node) to which the acknowledgement is to be sent. The addressed, allocation-requesting node detects the acknowledgement bits in the allocated time slot and changes the time slot's status bits to reflect a busy state. The target node responds by changing its time slot's status bits to also reflect a busy state. This results in a stable time slot path being established between the two nodes. When use of the path is completed, either node may place its time slot in an idle state. The other node responds by also placing its time slot in an idle state.

BRIEF DESCRIPTION OF THE DRAWING

A further understanding of my invention may be had from a reading of the ensuing description together with the drawing, in which.

GENERAL DESCRIPTION

Figure 1:
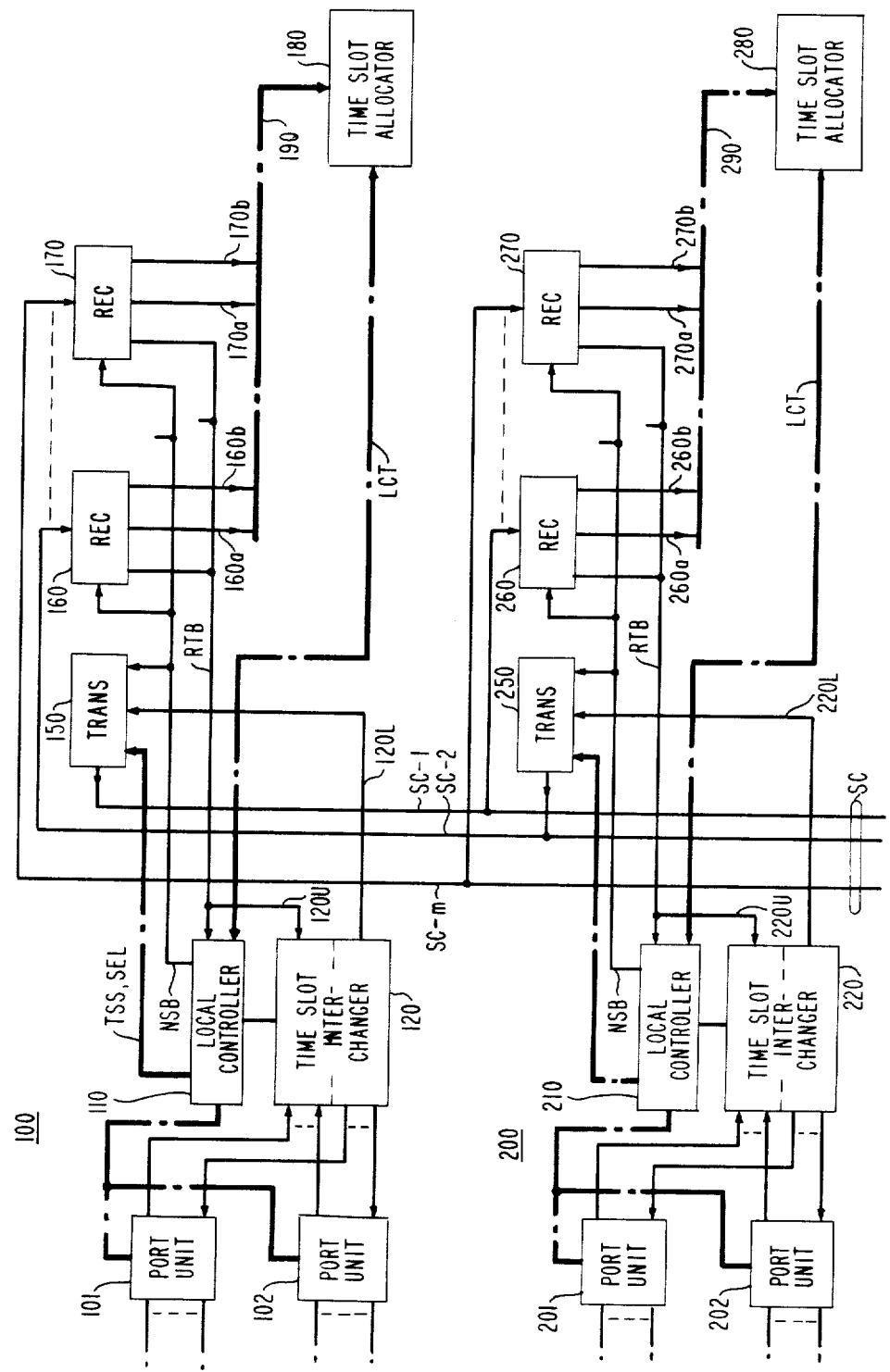
FIGS. 1 and 2 show a plurality of TSI nodes interlinked without the use of a time multiplex switch or common controller.
Figure 2:
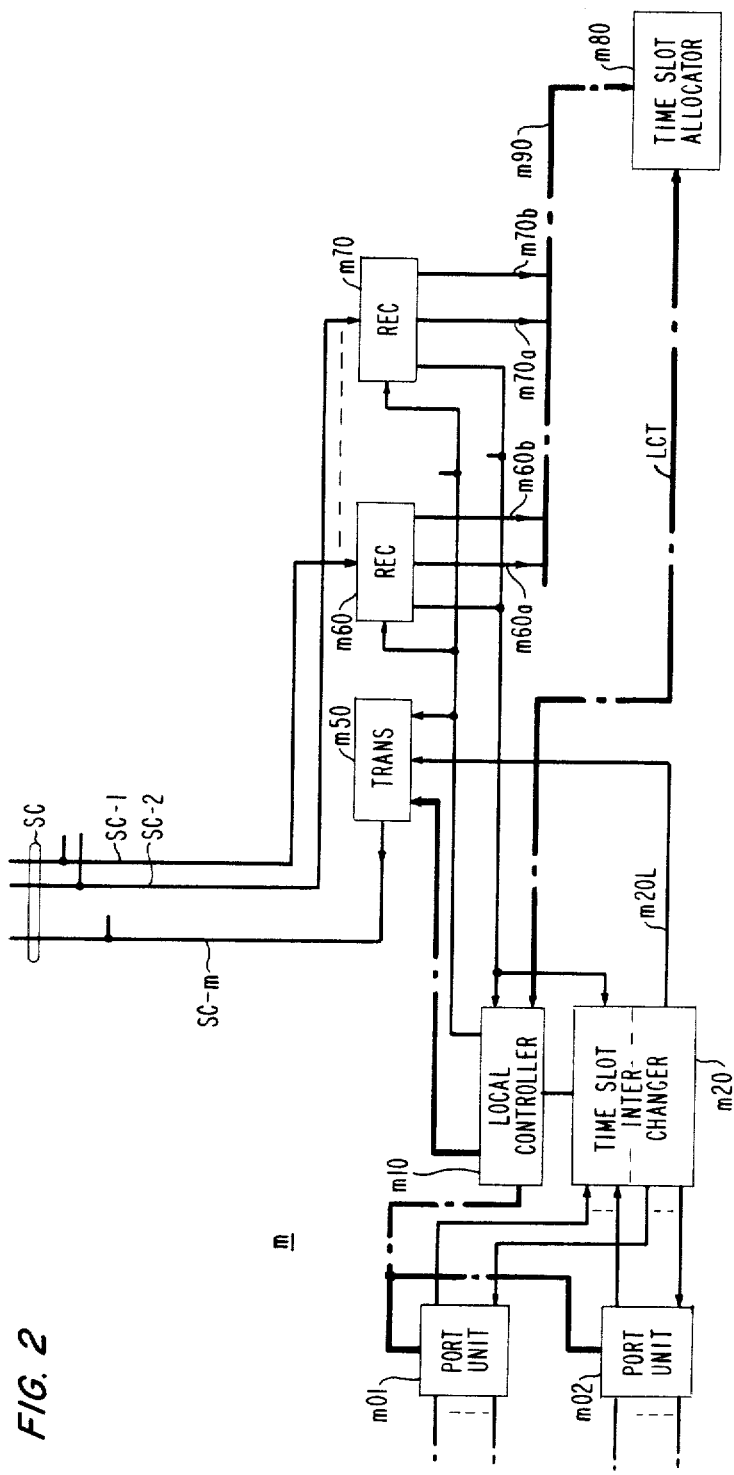
Figure 3:
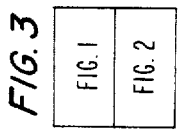
FIG. 3 shows how FIGS. 1 and 2 should be assembled.

In FIG. 1 and FIG. 2, a plurality of TSI nodes 100, 200 and "m" are shown, each serving a respective plurality of port interface units 101, 102; 201, 202; m01, m02. The port interface units may be of the type which serve analog or digital telephone sets or other data terminal apparatus (not shown). Each TSI node includes a respective time slot interchanger 120, 220, m20 under the control of a local controller 110, 210, m10, respectively. The upper part of each time slot interchanger is schematically indicated as receiving time slot words incoming from the port interface units 101, etc., while the lower part is indicated as transmitting time slot words outgoing to the port interface units 101, etc. Exemplary types of time slot interchangers are disclosed, for example, in an article by R. D. Gordon, H. G. Alles, and G. D. Bergland entitled "An Experimental Digit Switch for Data and Voice", *ISS '81 CIC*, Montreal, 21-25 September, 1981, Session 21B, Paper 3, and in the co-pending application of R. K. Witmore 5, U.S. Ser. No. 413,155, filed Aug. 30, 1982.

As disclosed in the prior art, when connections were required to be established between two different TSI nodes both a time multiplex switch and common controller for time slot allocation were needed. In accordance with our invention, however, no such time multiplex switch and common controller are required. Instead, each TSI node is linked via a simple cable SC to the other nodes. If it is desired that time slot words be sent bit-serially, cable SC may simply contain a plurality of conductors equal to the number of TSI nodes to be interlinked. If it is desired that time slot words be sent in parallel, cable SC may advantageously contain a plurality of sub-cables SC-1, SC-2 and SC-m equal to the number of nodes to be interlinked; each sub-cable then containing a conductor for each bit position of a time slot word (including the two extra status bit positions which are added in accordance with my invention).

Each TSI node such as node 100 includes a respective transmitter such as transmitter 150 driving a respective sub-cable of cable SC such as sub-cable SC-1. Each TSI node also includes a receiver respective to each of the other sub-cables of cable SC. For example, TSI node 100 includes receiver 160 respective to sub-cable SC-2 and receiver 170 respective to sub-cable SC-m. TSI node 200 contains a transmitter 250 which drives sub-cable SC-2, a receiver 260 which receives the signals on sub-cable SC-1 and a receiver 270 which receives the signal on sub-cable SC-m. In TSI node, "m", transmitter m50 drives sub-cable SC-m, receiver m60 receives the signals on sub-cable SC-1 and receiver m70 receives signals on sub-cable SC-2.

A time slot may be required for use for communications between stations served by different nodes. Such communications are those that would take place between a station served by port interface unit 101 of node 100, for example, and a station served by port interface unit m02 of node "m". Assuming that all nodes are identical in that their TSIs have the same number of time slots and the time slots are synchronized, in order for inter-nodal communications to take place, the "same" time slot must be available for use in node 100 and in node "m".

In order to permit a time slot to be used either for local or for inter-nodal communications, an additional field consisting of two status bit positions is added to the time slot word in every node's TSI. Every time slot word now comprises a data or address (D/A) field and a status (ST) field. The D/A field of the time slot word is, in accordance with another aspect of my invention, made subject to interpretation by the contents of the status field. When the status field of an incoming time slot word indicates a busy time slot, the D/A field of the time slot word is understood by the receiver to contain communications data in the usual manner. When the status field indicates an idle time slot, the contents of the D/A field is immaterial. When the status field of a time slot word indicates "Alloc. Req.", the D/A field contains the address of the node at which the time slot is desired to be allocated for use. When the status filed indicates "Alloc. Ack.", the D/A field contains the address of the node to which the acknowledgement is being directed.

Let it be assumed that controller 110 at node 100 receives a request originating at port interface unit 101 for an inter-nodal communications connection to port interface unit m02 at node m. Controller 110 must now find a common time slot that is locally idle and is also idle at node "m". To accomplish this, controller 110 presents "m" to time slot allocator 180. Controller 110 will also, during each locally idle time slot, enable its receivers 160 through 170 to report to time slot allocator 180 whether the status field of a time slot word incoming from any remote node during the locally idle time slot is either idle or requesting allocation of the locally idle time slot. Each receiver is equipped with logic circuitry described by Table I to decode the two bit status field "ST" (see FIG. 4) and to activate its respective "a" lead if the incoming time slot word is in the "Alloc. Req." state or to activate its respective "b" lead if the incoming time slot word is idle.

Figure 5:
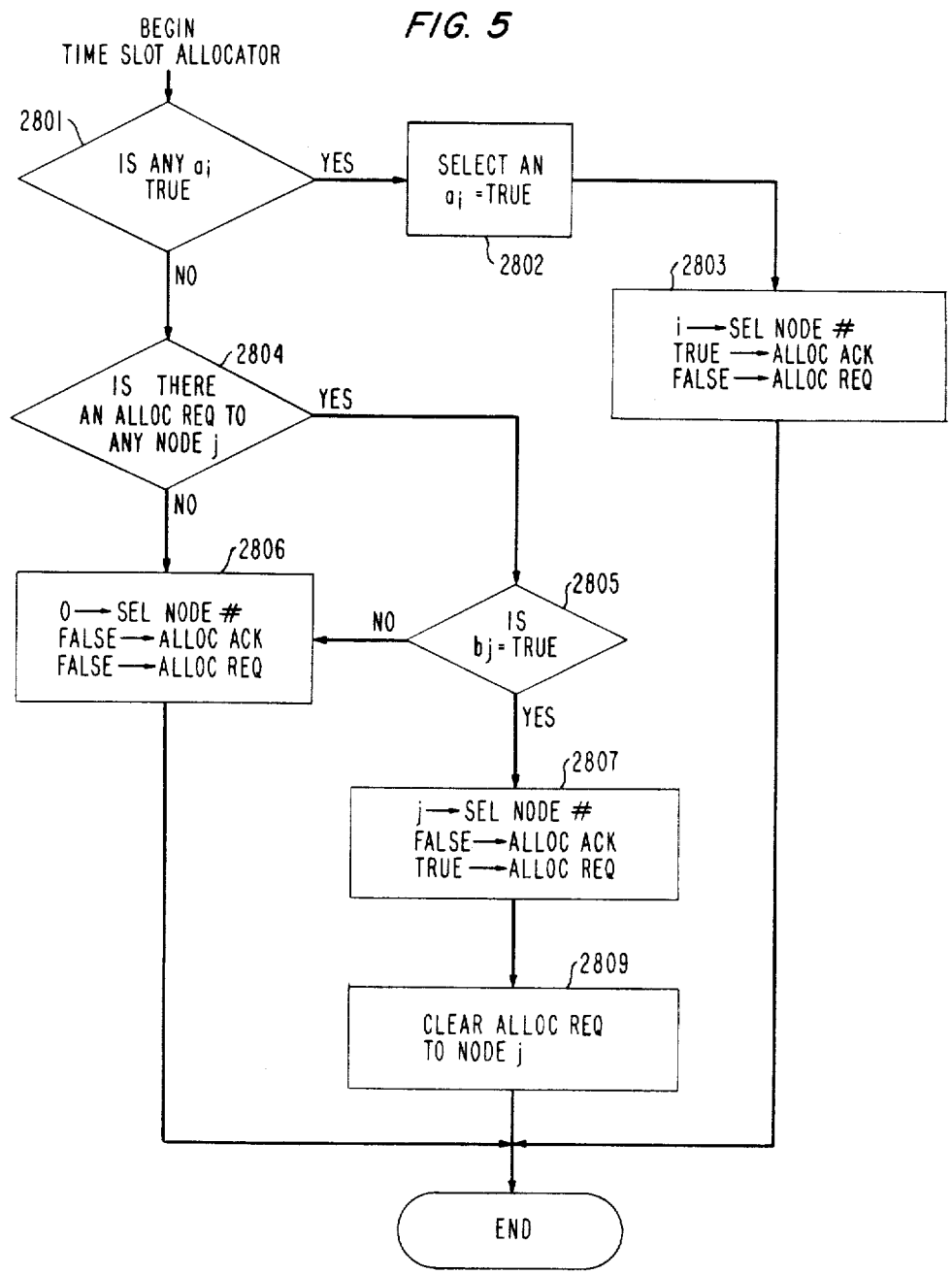
FIG. 5 is a flowchart of the processes performed by a time slot allocator at each node.

Time slot allocator 180 is a microprocessor-controlled logic circuit that executes the process of flow chart FIG. 5, to be hereinafter described. If a remote node is requesting allocation of the locally idle time slot, the remote node is given preference by allocator 180. Assuming that no remote node requests allocation of the locally idle time slot, time slot allocator 180 responds to the state of the receiver "b" leads and determines whether the "b" lead of receiver 170 serving the cable from node "m" reports that the time slot arriving from node "m" and the synchronous local time slot are both idle. If such is the case, allocator 180 informs controller 110. Controller 110 updates its internal time slot status, causing transmitter 150 to write the address of node "m" in the D/A field and the status "Alloc. Req." in the status bits of the locally idle time slot which node 100 transmits on cable SC-1.

The foregoing operations of time slot allocator 180 with respect to receiver 170 will now be explained in somewhat more detail with respect to flow chart FIG. 5 and Table I. Logic 2801 of time slot allocator 180 examines the state of the "a" leads from the node's receivers to determine if any incoming time slot word from a remote node is making a request for allocation of the present time slot ($a_i$=True) at this node. If an "a" lead is true, decision logic 2801 enables process 2802 to make a selection of one of the allocation-requesting receivers.

If none of the receivers receives a request from a remote node for allocation of the present time slot, no "a" lead will be true. Recalling the assumption that local controller 110 has received a request for an inter-nodal connection to node "m", controller 110 presents "m" to the time slot allocator 180 over cable LCT (see FIG. 4). Decision logic 2804 of allocator 180 responds to the signal on cable LCT and enables decision logic 2805 to examine lead 170b from receiver 170 serving node "m", to determine whether there is a common idle time slot. (See Table I, third row.) If the current time slot is idle both locally and at node "m", (decision logic 2805, $b_m$=True), process 2807 is executed and time slot allocator 180 informs local controller 110 over cable LCT that the state of the current time slot at transmitter 150 should be changed from idle to "Alloc. Req." and that the address of node "m" should be placed in the D/A field of the time slot. Process 2809 is then executed to clear the now satisfied allocation request from the time slot allocator 180.

When the time slot word transmitted by node 100 over cable SC-1 arrives at node "m" (and if the time slot is still idle there) receiver m60 associated with cable SC-1 at node "m" will execute the fourth row of functions shown in TABLE I. Time slot allocator m80 (FIG. 2) at node "m" will then detect that "a" lead m60a is true. Assume process 2802 (FIG. 5) selects lead m60a. Process 2803 is executed and time slot allocator m80 informs local controller m10 over cable LCT that the state of the current time slot at transmitter m50 should be changed from idle to "Alloc. Ack." and that the address of node 100 should be placed in the D/A field of the time slot.

When the time slot word on cable SC-m is received by receiver 170 at node 100, FIG. 1, it will arrive with its status field in the "Alloc. Ack." state and with its D/A field having an address identifying node 100. Receiver 170 executes the first row of functions of TABLE I delivering the incoming time slot word over cable RTB to local controller 110. Controller 110 then changes the state of the status field of the time slot outgoing from node 100 at transmitter 150 from "Alloc. Req." to "busy" and inserts in the time slot's D/A field the contents of the appropriate time slot word from time slot interchanger 120. At the remote module "m" the status field of the aforementioned time slot word received from node 100 is seen to move from the "Alloc. Req." state to the "busy" state. This indicates to node "m" that a communications connection has been established. Node "m" then changes the state of the status bits of the time slot which it transmits to node 100 from "Alloc. Ack." to "busy". This results in a stable time slot path between the two nodes.

To release the path, either node 100 or the remote node "m" may set the state of the time slot to idle. When both nodes have the time slot status as idle, the time slot is available for reallocation for use on another inter-nodal or intra-nodal call.

It thus can be appreciated that one aspect of the method of operation of the system of the present invention is to "broadcast" the state of each time slot at a node to all other nodes so that the time slot may be allocated for use on a call between any two nodes currently having the time slot idle.

Figure 4:
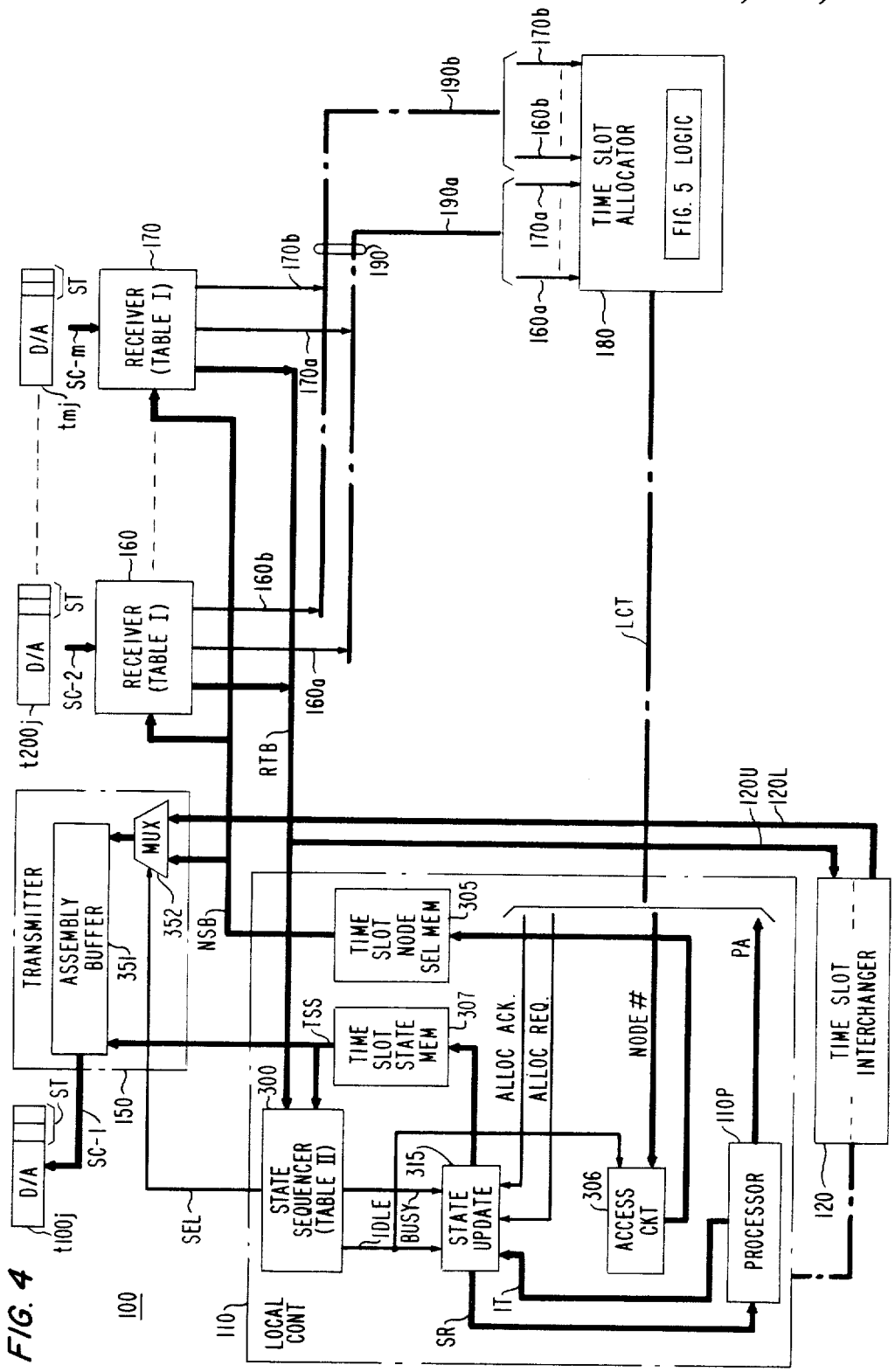
FIG. 4 a schematic drawing of the local controller at each node.

FIG. 4 shows further details of the illustrative node 100 of FIG. 1. The relationship of time slot interchanger 120, local controller 110, time slot allocator 180, receivers 160, 170, and transmitter 150 is illustrated. Conditions are shown during an arbitrary time slot "j" referred to as the current time slot. Transmitter 150 is placing time slot word t100j on cable SC-1 at the same time that receiver 160 is receiving time slot word t200j on cable SC-2 from remote node 200. Receiver 170 is receiving time slot word tmj on cable SC-m from remote node "m". Each time slot word includes a D/A field and a status field "ST" to represent one of the idle, busy, "Alloc. Req." and "Alloc. Ack." states.

Local controller 110, time slot allocator 180, receivers 160 through 170, and transmitter 150 are all synchronized with the standardized, recurrent frame of time slot words of time slot interchanger 120. A variety of methods to accomplish this synchronization are well known in the art. One simple technique is to distribute to all the elements of FIG. 4 a common clock signal that signifies the beginning of each time slot period. The synchronization of time slot "j" incoming from the remote nodes over respective cables SC-2 through SC-m with the time slot "j" of time slot interchanger 120 is achieved by equipping receivers 160 through 170 with buffers (not shown), a technique well known to those skilled in the art.

With local controller 110 are a microprocessor 110P, a state sequencer 300 (which executes the states of Table II), two memory units 305 and 307 each of which has a word location individual to each time slot of the standardized, recurrent frame of time slot words, and access and update units 306 and 315, respectively.

State sequencer 300 controls multiplexor 352 (over lead SEL) and the state transitions of each time slot (over leads IDLE and BUSY) by providing the output signals listed in the right-hand three columns of Table II in response to the input signals listed in the left-hand three columns. Time slot node select memory 305 contains in each word location either the address of a remote node or a "zero address". Time slot state memory 307 contains, in each word location, the status bits for the corresponding time slot and one additional bit which, if set, indicates that microprocessor 110P has requested that the corresponding time slot be placed in the idle state. With this bit set and an idle pattern in the time slot status bits, the word location will contain the pattern for the Rel. Req. (release request) state noted in the last row of Table II.

Access circuit 306 controls the memory writes into time slot node select memory 305. During the current time slot "j", access circuit 306 will write a "zero address" into location "j" of memory 305 if lead IDLE from state sequencer 300 is activated. Otherwise, if a non-zero value appears on lead NODE# from time slot allocator 180, that value is written into location "j".

State update circuit 315 controls the memory writes into time slot state memory 307. During the current time slot "j", if an IDLE, BUSY, ALLOC. ACK., or ALLOC. REQ. lead is activated, state update circuit 315 will write the bit pattern for the corresponding state into location "j" of memory 307. In addition to writing memory 307, circuit 315 will also report to processor 110P over lead SR that a state change has occurred on time slot "j".

State update circuit 315 also receives time slot release request signals over lead IT from microprocessor 110P. If circuit 315 receives a release request signal it will write a release request pattern into the word location of memory 307 corresponding to the time slot specified by microprocessor 110P.

Microprocessor 110P executes the overall control logic for node 1100. In a reduction to practice this microprocessor might be an Intel 186 or a Motorola 68000. Microprocessor 110P makes time slot allocation requests to time slot allocator 180 over lead PA, and time slot release requests to state update 315 over lead IT. Microprocessor 110P also receives time slot state change reports from state update 315 over lead SR. In order to appropriately process the state change reports, microprocessor 110P has read only access (not shown) to memories 305 and 307. Methods to reduce these interfaces to practice are well known to those skilled in the art.

Transmitter 150 includes an assembly buffer 351 which assembles the outgoing time slot word for transmission on cable SC-1 by joining the D/A field provided by multiplexor 352 to the status field "ST" provided from time slot state memory 307. The D/A field is obtained by multiplexor 352 either from time slot interchanger 120 via cable 120L or from node selection memory 305 via cable NSB. The decision as to whether the information on cable NSB or on cable 120L will be furnished to transmitter 150 is made by multiplexor 352 under the control of lead SEL from state sequencer 300.

As mentioned above, local controller 110 will, during each locally idle time slot, enable receivers 160 through 170 to report to time slot allocator 180 whether the status field of a time slot word incoming from any remote node during the locally idle time slot is either idle or requesting allocation of the locally idle time slot. A "locally idle" time slot is one not now assigned for use on an intra-nodal connection within node 100 and has not yet been allocated for use by node 100 to communicate with any remote node. Consequently, node select memory 305 should have a "zero address" in each word location that corresponds to a locally idle time slot. Similarly, time slot state memory 307 should have the "idle" bit pattern in each word location that corresponds to a locally idle time slot. During each time slot, node select memory 305 places the contents of its corresponding time slot word on bus NSB and time slot state memory 307 places the contents of its corresponding time slot word on bus TSS. If the time slot is locally idle, a "zero address" is placed on bus NSB and an "idle" bit pattern is placed on bus TSS. The appearance of the zero address word on bus NSB causes each of receivers 160 through 170 to activate its "a" and "b" leads (160a, b; 170a, b) of cable 190 according to Table I.

Assume that processor 110P has received a request to establish a connection to node "m", and has furnished the address of node "m" to time slot allocator 180 over lead PA of cable LCT. Also assume, as before, that during a locally idle time slot (the current time slot) no "a" lead in cable 190 is true and that "b" lead 170b for node "m" is true (because the incoming time slot from node "m" is also idle). Allocator 180, in response to the energization of the "b" lead from receiver 170, applies the address of node "m" over lead node of cable LCT to access circuit 306. Access circuit 306 writes the address of node "m" into the word location of node select memory 305 assigned to the current time slot. At the same time, allocator 180 activates the "Alloc. Req." lead of cable LCT causing state update control circuit 315 to write the status field pattern for "Alloc. Req." into the ST word location of time slot state memory 307 assigned to the current time slot.

When this time slot reoccurs, node selection memory 305 places the address of node "m" on bus NSB, and time slot state memory 307 places the "Alloc. Req." pattern on bus TSS. The address of node "m" on bus NSB causes receiver 170 to be selected. In accordance with the first row of Table I, receiver 170 places the incoming time slot from node "m" on bus RTB. Assume that the ST field of the incoming time slot is still idle. In accordance with the second row of Table II, state sequencer 300 energizes its "SEL" lead to cause multiplexer 352 to steer the address of node "m" on the NSB bus to the D/A field of assembly buffer 351. The "Alloc. Req." pattern on bus TSS is placed in the ST field of assembly buffer 351. The time slot word so assembled is placed on cable SC-1 by transmitter 150 and is "broadcast" to all remote nodes. Remote node "m" detects its address in the D/A field of the arriving time slot word and its decision logic (comparable to decision logic 2801 of FIG. 5) responds to the "Alloc. Req." state of the status field ST in the manner previously indicated. Assuming that the selected time slot is still idle at node "m", node "m" will formulate a reply message containing node 100's address in the time slot's D/A field and the status "Alloc. Ack." in the time slot's ST field.

When the time slot dispatched by node "m" is received by receiver 170 of node 100, it will contain a time slot word whose D/A field contains node 100's address and whose status field contains the pattern "Alloc. Ack." When this time slot again occurs in node 100, node selection memory 305 places the address of node "m" on bus NSB and time slot state memory 307 places the "Alloc. Req." pattern on bus TSS. As described previously, this will cause receiver 170 to be selected. Receiver 170 will place the contents of the incoming time slot on bus RTB in accordance with the first row or Table I. Sequencer 300 receives the incoming time slot word appearing on bus RTB and the local time slot state appearing on bus TSS. In accordance with the fourth row of Table II, sequencer 300 activates its output lead "busy" to circuit 315 so that the busy state pattern is written into the word for this time slot in time slot state memory 307. At the same time, sequencer 300 will activate its select lead "SEL" to cause multiplexer 352 to obtain from bus NSB the address of node "m" for the D/A field of the outgoing time slot word at transmitter 150.

On the next occurrence of this time slot, the new state will be presented to transmitter 150. Since the new state is "busy", state sequencer 300 will activate its "SEL" lead so that multiplexor 352 will obtain the D/A field of the outgoing time slot word from bus 120L.

At remote node "m", the new busy state will be detected in the incoming time slot. The remote node's state sequencer will cause this time slot state to also move to the busy state. This results in a stable time slot path between the two nodes.

Let us assume that node 100 wishes to release the time slot path. Processor 110P (FIG. 4) signals state update 315 to place a specified time slot in a local release request state. State update 315 writes a "Rel. Req." pattern into the status bits of the word location of time slot state memory 307 assigned to the specified time slot. When the specified time slot becomes the current time slot, this pattern will be presented to both transmitter 150 and state sequencer 300. When this pattern is presented to transmitter 150, an "idle" pattern is placed in the assembly buffer 351. When this pattern is presented to state sequencer 300, the idle lead will be activated in accordance with the last row of Table II. Activation of the idle lead will cause state update 315 to write an "idle" pattern into the word location of time slot state memory 307 assigned to the current time slot. It will also cause access circuit 306 to write "zero" into the word location of node select memory 305 assigned to the current time slot.

Accordingly, there has been described a distributed processing architecture which enables a plurality of switching nodes to effect inter-nodal connections. Each node broadcasts its time slot words to remote nodes, and each node can ascertain during a locally idle time slot whether a desired remote node also has the locally ascertained idle time slot idle. Each node can request allocation of such a time slot, can acknowledge a request for allocation and finally can allocate that time slot for use on the inter-nodal connection. What has been described is deemed illustrative of my invention. Further any other modifications may be made by those skilled in the art without however, departing from the spirit and scope of my invention.

TABLE I

Receiver Table

| Input Conditions | | | Output Values | | |
|---|---|---|---|---|---|
| Node Select Bus (NSB) Address | Rec'd T.S. Field | | | A Lead | B Lead |
| | (ST) | (D/A) | Cable RTB | | |
| This Rcvr. (Loc. T.S. Idle ) | any | any | Inc. Time Slot D/A & ST | false | false |
| Any other Rcvr. (Loc. T.S. Idle ) | any | any | null | false | false |
| "Zero" (Loc. T.S. Idle) | Idle | N/A | null | false | true |
| "Zero" (Loc. T.S. Idle) | Alloc Req. | This node | null | true | false |
| "Zero" (Loc. T.S. Idle) | Alloc Req. | Not this node | null | false | false |
| "Zero" (Loc. T.S. Idle) | Alloc Ack. | N/A | null | false | false |
| "Zero" (Loc. T.S. Idle) | Busy | N/A | null | false | false |

TABLE II

State Sequencer 300

| Inputs | | | Outputs | | |
|---|---|---|---|---|---|
| Local T.S. State (from 307) | Rec'd T.S. Field (from RTB) | | SEL (to 352) | Busy (to 315) | IDLE (to 315 and 306) |
| | (ST) | (D/A)= Local Node? | | | |
| Idle* | dc | dc | 120L | false | false |
| Alloc. Req. | Idle | dc | NSB | false | false |
| | Alloc. Req. | dc | " | false | true |
| | Alloc. Ack. | yes | " | true | false |
| | Alloc. Ack. | no | " | false | true |
| | Busy | dc | " | false | true |
| Alloc. Ack. | Idle | dc | " | false | true |
| | Alloc. Req. | yes | " | false | false |
| | Alloc. Req. | No | " | false | true |
| | Alloc. Ack. | dc | " | false | true |
| | Busy | dc | " | true | false |
| Busy | Idle | dc | 120L | false | true |
| | Alloc. Req. | dc | " | false | true |
| | Alloc. Ack. | yes | " | false | false |
| | Alloc. Ack. | no | " | false | true |
| | Busy | dc | " | false | false |

TABLE II-continued

| | State Sequencer 300 | | | |
|---|---|---|---|---|
| | Inputs | | Outputs | |
| Local T.S. State (from 307) | Rec'd T.S. Field (from RTB) (ST) | (D/A)= Local Node? | SEL (to 352) | Busy (to 315) | IDLE (to 315 and 306) |
| Rel. Reg. | dc | dc | " | false | true |

*State update (if any) is supplied by 180
dc = don't care

What is claimed is:

1. A distributed switching system comprising
a first and at least a second time division multiplex switching node each having a comparable set of assignable time slots,
means for substantially simultaneously broadcasting the contents of each said comparable set of time slots among all said switching nodes,
means at each said switching node for independently assigning any of said time slots for an intra-nodal connection, and
control means at said first node, responsive to a request at said first node for an inter-nodal connection, for requesting allocation of an idle time slot at a second said node, said control means comprising means operative during an idle time slot at said first node for observing the contents of said comparable time slot broadcast by said second node.

2. A distributed switching system according to claim 1, wherein said control means at said first node further comprises:
means operable when said observed broadcast time slot is idle for issuing an allocation request signal to said second node.

3. A distributed switching system according to claim 1 wherein said control means at said first node further comprises:
means operable when said observed broadcast time slot requests allocation of said time slot at said first node and said time slot is idle at said first node for broadcasting an acknowledgement signal.

4. A distributed switching system according to claim 2 wherein said means for issuing comprises means for transmitting said allocation request signal in a given time slot via said means for broadcasting, and said distributed switching system further comprises:
means at said second node responsive to said allocation request broadcast by said first node when the time slot comparable to said given idle time slot is available for said inter-nodal connection at said second node for returning to said first node an allocation acknowledge signal.

5. A distributed switching system according to claim 4 wherein said means for returning comprises means for transmitting said allocation acknowledgement signal to said first node via said means for broadcasting and wherein said control means at said first node further comprises:
means operative when said allocation acknowledge signal broadcast by said second node is received at said first node for marking said time slot busy.

6. A distributed switching system according to claim 5 wherein said means for transmitting includes
means for inserting the address of said second node in said given idle time slot.

7. A distributed switching system according to claim 1 wherein said means for broadcasting includes means for writing time slot status information in said time slots.

8. A distributed switching system according to claim 7 wherein said control means includes means for marking a predetermined portion of the contents of an idle time slot at said first node to request said allocation at said second node.

9. A distributed switching system according to claim 2 wherein said means for issuing comprises
means for transmitting said allocation request signal in a given idle time slot via said means for broadcasting.

10. A time-multiplexed communication system comprising
a plurality of nodes each of said nodes having an associated transmit bus and comprising means for transmitting information on the transmit bus associated therewith in recurring frames each frame comprising a comparable set of time slots;
means for connecting the transmit bus associated with each node to the other of said nodes such that the time slots on each transmit bus are applied to all other nodes;
means at a first one of said nodes for generating communication request signals requesting communication with a second one of said nodes; and
said first node further comprises means responsive to the contents of the time slots from said second node and said communication request signals for generating allocation request signals when a given time slot is idle at said first node and the contents of the comparable time slot from said second node indicate the comparable time slot is idle at said second node.

11. The time mulitplex communication system in accordance with claim 10 wherein said first node further comprises means responsive to said allocation request signals for transmitting representations of said allocation request signals to said second node in said given time slot.

12. The time-multiplex communication system in accordance with claim 11 wherein said second node comprises means responsive to said allocation request signal representations in said given time slot for transmitting allocation acknowledgment signals to said first node in said comparable time slot when said comparable time slot is idle at said second node.

13. The time-multiplex communication system in accordance with claim 12 wherein said first node comprises
means responsive to said allocation acknowledgment signal in said comparable time slot from said second node for transmitting busy status signals in said given time slot to said second node.

14. The time-multiplex communication system in accordance with claim 13 wherein said second node comprises means responsive to said busy status signals in said given time slot from said first node for transmitting busy status signals in said comparable time slot to said first node.

15. The time-multiplex communication system in accordance with claim 14 wherein each time slot comprises a status portion and a data/address portion and wherein said nodes comprise
means for transmitting said allocation request signals, said allocation acknowledgment signals, and said busy status signals in said status portion and means for transmitting the indentity of another one of said nodes in said data/address portion.

* * * * *